Dec. 15, 1931.  R. G. MAY  1,836,608

AUTOMOBILE DIRECTION INDICATOR

Filed May 17, 1930  2 Sheets-Sheet 1

Inventor
R. G. May.
By L. F. Rudolph, Jr.
Attorney

Dec. 15, 1931.   R. G. MAY   1,836,608
AUTOMOBILE DIRECTION INDICATOR
Filed May 17, 1930   2 Sheets-Sheet 2
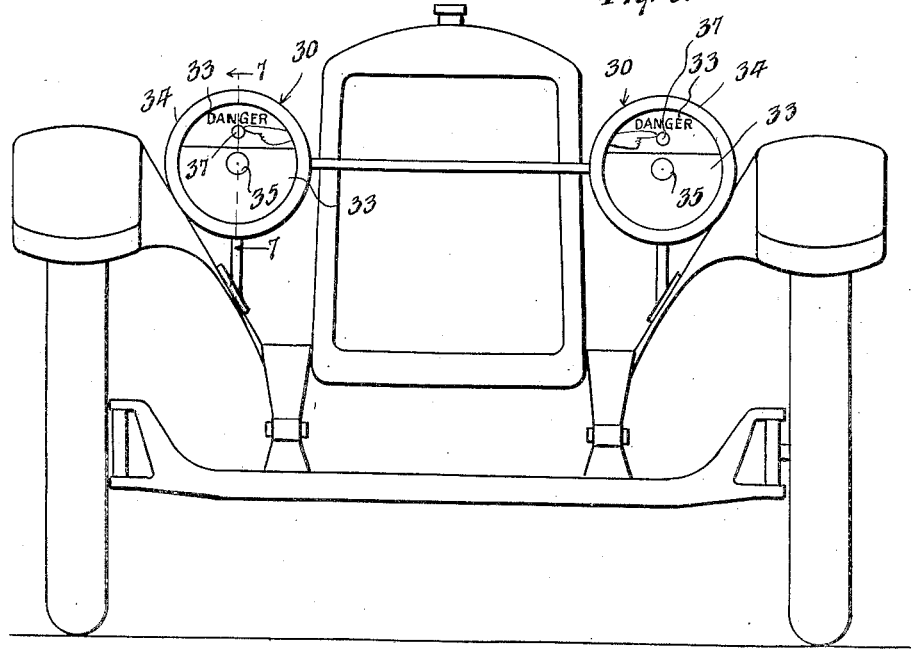
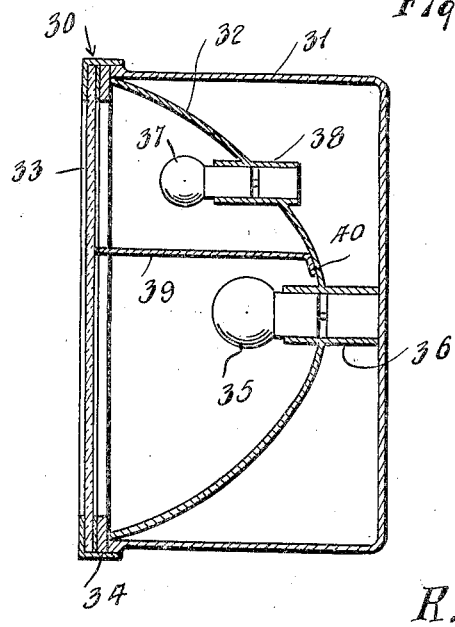

Patented Dec. 15, 1931

1,836,608

UNITED STATES PATENT OFFICE

ROBERT G. MAY, OF LOUISVILLE, KENTUCKY

AUTOMOBILE DIRECTION INDICATOR

Application filed May 17, 1930. Serial No. 453,321.

This invention relates to direction indicating means for use on automobiles to apprise adjacent traffic of intended maneuvers with a view to increasing safety both with regard to traffic and pedestrians.

One particular object is to provide a novel construction wherein the direction indicators or signals are incorporated in the headlights of the automobile and the dimmer light thereof used in connection with coacting structure for their illumination.

In addition it is aimed to provide a novel construction of signal housing adapted for illumination in the event of a contemplated turn or stop which is provided with novel transparent or translucent projections to extend beyond the casing, having flanges to engage the latter, and being engageable by a resilient element within the casing to hold them in place.

Various additional objects and advantages will become apparent from a consideration of the description following taken in connection with accompanying drawings illustrating an operative embodiment.

In said drawings:—

Figure 1:
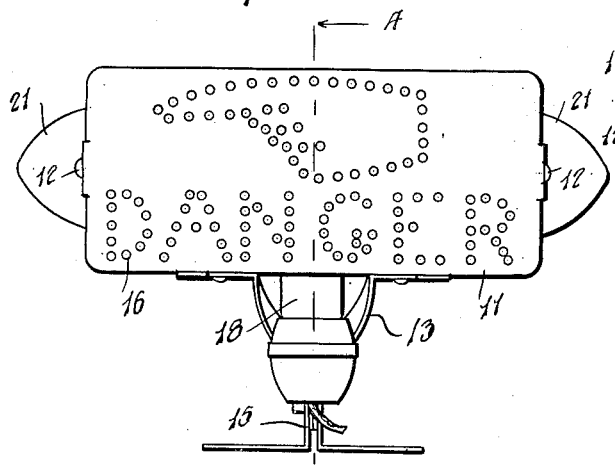
Figure 2:
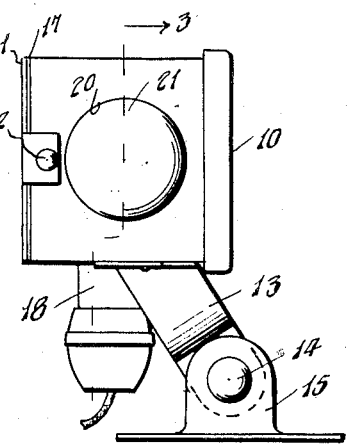
Figure 3:
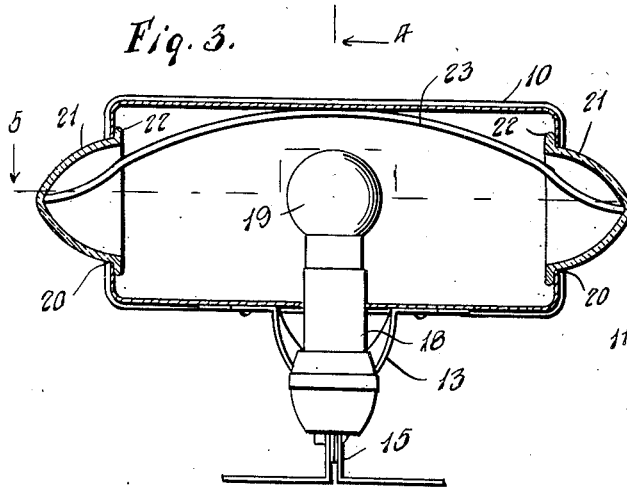
Figure 4:
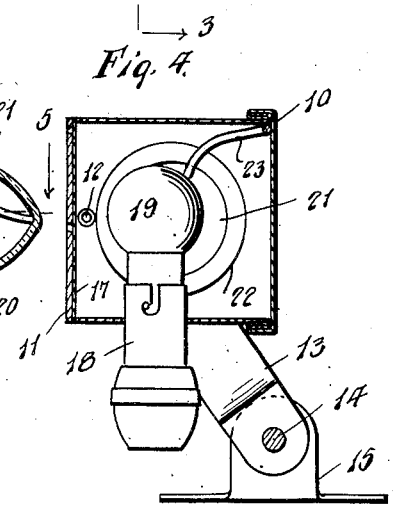
Figure 5:
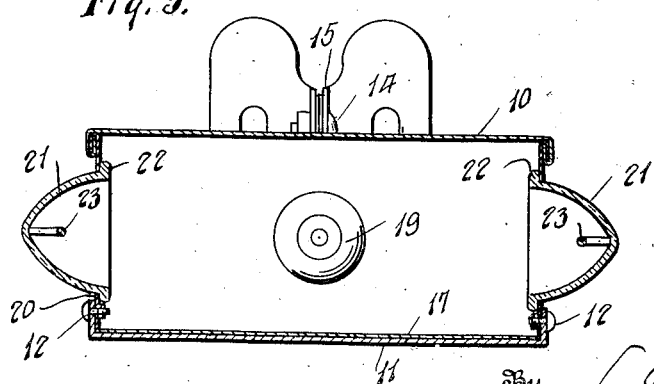

Figure 1 is an elevation showing a signal box or direction indicator constructed in accordance with the invention, Figure 2 is an end view thereof, Figure 3 is a vertical sectional view taken on the line 3—3 of Figure 2, Figure 4 is a vertical sectional view taken on the line 4—4 of Figure 1, Figure 5 is a horizontal sectional view taken on the line 5—5 of Figure 3, Figure 6 is a front elevation showing the direction indicator means embodied in automobile headlights, and Figure 7 is a cross sectional view taken on the line 7—7 of Figure 6.

Referring specifically to the drawings, and first to the form shown in Figures 1 to 5, 10 designates a suitable casing of metal or any other desired material which has a removable cover 11 secured in place by bolts at 12. Extending at an angle from the bottom wall of the casing are a pair of ears 13 which meet at their lower ends and are connected by a bolt 14 adjustably securing them to sections 15 selectively forming a bracket and adapted to be attached to a fender or any other suitable part of an automobile.

The wall 11 constitutes a signal plate since it has various openings or perforations at 16 delineating any suitable word or words or figure. As shown, the word "Danger" is displayed and the representation of a hand is also shown. In case the driver of an automobile equipped with the invention intends to make a turn, a suitable switch will be closed to cause the casing 10 to be illuminated and hence the hand and word to be illuminated.

Back of the plate 11, a sheet of colored translucent material 17 is preferably positioned, for instance red or other colored celluloid, paper or the like.

In order to illuminate the casing, a socket member 18 is fastened in the bottom wall thereof and a bulb 19 within the casing is detachably connected to the socket. The socket is arranged in conducting relation with any suitable source of electrical energy such as the battery of the automobile with which the invention is equipped.

The ends of the casing are provided with openings at 20 and disposed therein and projecting mainly exteriorly of the casing are transparent or translucent globes 21 having integral flanges 22 adapted to engage the interior of the end walls of the casing so that the globes cannot be completely passed through such openings 20. Within the casing, a retaining element 23 is provided for the globes, the same preferably being a length of spring wire which extends into each globe, engaging the apex of the hollow portion thereof and also engaging one corner of the casing as best shown in Figure 4. The globes are thus readily removable and simply held in place by a single element.

In the form of the invention shown in Figures 6 and 7, it is incorporated into automobile headlights 30. These headlights include a casing 31 having a reflector 32 therein across the front of which a lens 33 is disposed, being secured to the casing by a depressible rim 34 or the like. The reflector 32 in the center thereof has a lamp or bulb 35 positioned in a socket 36 and above the same has a lamp or bulb 37 positioned in a socket 38. The lamp 35 may represent the ordinary bright headlight lamp and the lamp 37 represents the dimmer headlight lamp, such lamps being used at different times and controlled from separate switches or separate portions of the same switch.

In adapting my invention to the construction described, a partition 39 is suitably soldered or otherwise fastened as at 40 to the reflector 32 and it extends forwardly to and engages lens 33. That portion of the lens or lenses above the partition 39 may contain the indicating or signalling matter, for instance have the word "Danger" delineated thereon and also the representation of hands delineated thereon as shown in Figure 7. The lens or portions thereof may be of any color desired and the letters and hands or other signal matter may be delineated or provided in any suitable way.

As a result of the construction described, the headlights will function as such normally when the switch to the bulbs 35 is closed. However, when the switch to the bulbs 37 is closed, the upper or signal portions of the lenses 33 will be illuminated and the signal matter thereon will be prominently displayed, it being noted that the hands preferably extend or point in opposite directions.

Various changes may be resorted to provided they fall within the spirit and scope of the invention.

I claim as my invention:—

1. A device of the class described comprising a casing, said casing at opposite walls having openings therethrough, hollow globes extending through said openings, said globes having flanges abutting the interior of the casing, and a resilient holding member common to and engaging the globes in the hollow portions at the apices thereof and also engaging said casing intermediate the ends thereof.

2. A device of the class described comprising a casing having openings in opposite walls thereof, hollow globes extending through said openings and impassable therethrough in an outward direction, and a resilient holding member common to and engaging the globes in the hollow portions at the apices thereof.

In testimony whereof I affix my signature.

ROBERT G. MAY.